United States Patent
Gluch

(10) Patent No.: US 6,647,330 B1
(45) Date of Patent: Nov. 11, 2003

(54) ELECTRONIC POWER ASSISTED STEERING SYSTEM AND METHOD

(75) Inventor: Mark W. Gluch, Grosse Ile, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/136,795

(22) Filed: Apr. 30, 2002

(51) Int. Cl.[7] .............................................. B62D 6/00
(52) U.S. Cl. .................. 701/41; 180/412; 180/280; 280/735
(58) Field of Search ...................... 701/41, 42; 180/412, 180/413, 416, 421, 422, 280; 280/735

(56) References Cited

U.S. PATENT DOCUMENTS

| | | | |
|---|---|---|---|
| 4,947,327 A | * 8/1990 | Kawagoe ...................... 701/42 |
| 4,949,265 A | * 8/1990 | Eguchi et al. ................. 701/42 |
| 5,018,070 A | * 5/1991 | Eguchi ......................... 701/42 |
| 5,150,021 A | 9/1992 | Kamono et al. |
| 5,224,042 A | * 6/1993 | Morrison ....................... 701/41 |
| 5,561,603 A | * 10/1996 | Goto ............................. 701/41 |
| 5,752,209 A | 5/1998 | Nishimoto et al. |
| 5,761,627 A | 6/1998 | Seidel et al. |
| 5,979,587 A | 11/1999 | Liubakka et al. |
| 6,095,945 A | 8/2000 | Graf |
| 6,108,599 A | * 8/2000 | Yamamoto et al. ............. 701/41 |
| 6,152,254 A | 11/2000 | Phillips |
| 6,161,905 A | * 12/2000 | Hac et al. ..................... 303/146 |
| 6,167,334 A | 12/2000 | Liubakka et al. |
| 6,198,992 B1 | * 3/2001 | Winslow ....................... 701/23 |
| 6,213,249 B1 | 4/2001 | Noro et al. |
| 6,223,852 B1 | 5/2001 | Mukai et al. |
| 6,260,356 B1 | 7/2001 | Baughn et al. |
| 6,266,591 B1 | 7/2001 | Wilson-Jones et al. |
| 6,549,842 B1 | * 4/2003 | Hac et al. |
| 6,553,293 B1 | * 4/2003 | Hac |

* cited by examiner

Primary Examiner—William A Cuchlinski, Jr.
Assistant Examiner—Olga Hernandez
(74) Attorney, Agent, or Firm—MacMillan, Sobanski & Todd, LLC

(57) ABSTRACT

An electronic power assisted steering system and method wherein vehicle operating parameters, such as steering rack rate and position, are employed to predict future current requirements of the power assisted steering system, and adjust vehicle operating parameters, such as engine and alternator systems, to assure the appropriate power supply to the power assisted steering system without voltage peaks or sags.

20 Claims, 4 Drawing Sheets

ELECTRONIC POWER ASSISTED STEERING SYSTEM AND METHOD

BACKGROUND OF INVENTION

The present invention relates to vehicles with electronic power assisted steering.

Conventionally, the power assist for steering in vehicles is provided by a hydraulic system that is powered by the engine crankshaft. However, more recently, electronic power assisted steering (EPAS) systems have come in to use. The EPAS systems are generally lighter weight and allow for more flexibility in controlling the power assist than the conventional hydraulic systems. But the EPAS systems require significant amounts of electrical current during certain high demand steering periods (such as parking), which is generally provided by the vehicle's alternator/battery system. Most of the time, though, a high current demand from the EPAS system is not present, and so it is also desirable to minimize the overall energy consumption that is, the current demands of the EPAS system is a high peak/low average demand. Consequently, some EPAS systems are designed with a controller that will increase the engine RPMs during these high demand periods, in order to increase the alternator output and reduce the risk of engine stall.

The drawback with these systems is that, while they employ the controller to ensure adequate current during high demand periods, it is only reactive—that is, it activates the necessary functions to increase the alternator output only after the high demand has already begun. Further, the inertias of the rotating components create their own time lag in assuring an adequate, timely output. So the increase in power demand remains ahead of the system response to it. When the increase in demand is faster than the system can respond, this will produce a sag in the system voltage. Furthermore, if there is a sudden reduction in demand, then a voltage spike can occur. Both the sag and spike are undesirable in that they can potentially damage vehicle electronic equipment, as well as produce undesirable vehicle operating characteristics that a vehicle operator may find objectionable.

Thus, it is desirable to have an EPAS system that overcomes the drawbacks of other EPAS systems which respond too slowly to the beginning and ending of high current demand periods from the steering system.

SUMMARY OF INVENTION

In its embodiments, the present invention contemplates an apparatus for a vehicle having an engine and an alternator. The apparatus includes a steering system having a steering wheel, a steering assembly operatively engaging the steering wheel and adapted to engage a vehicle wheel assembly, an electric motor operatively engaging the steering assembly, and a steering motor controller operatively engaging the electric motor. The apparatus has a steering sensor capable of determining at least one of a position of the steering assembly and a rate of movement of the steering assembly, a first determinor for determining if the steering assembly is moving toward an increase in a power requirement, a second determiner for determining an amplitude of the increase in the power requirement, and a third determiner for determining a timing of the increase. The apparatus also includes a current regulator adapted for adjusting the power output of the alternator in response to the amplitude and timing of the increase.

The present invention further contemplates a method for controlling a vehicle electric power supply that provides power to an electronic power assisted steering system. The method comprises the steps of: determining a position of a steering member; determining a rate of movement and a direction of movement for the steering member; determining if the steering member is moving toward an electrical power peak; determining the vehicle speed; calculating the derivative of the rate of movement for the steering member; calculating a first future point in time at which a particular electrical power increase is needed for the electronic power assisted steering system, if the steering member is moving toward the electrical power peak; calculating the amplitude of the particular power increase at the first future point in time, if the steering member is moving toward the electrical power peak; and adjusting the electric power supply to produce a power output that includes the particular power increase, at the first future point in time, if the steering member is moving toward the electrical power peak.

An embodiment of the present invention allows for an anticipatory control signal to be produced that can affect both the engine controller and an alternator field current regulator in order to anticipate the beginning and ending of high demand periods from the EPAS system.

An advantage of the present invention is that the alternator control loop will be better able to maintain proper vehicle system voltage during EPAS operation. In particular, voltage sags and peaks will be minimized during EPAS operation.

Another advantage of the present invention is that the vehicle driver will not experience a noticable change in intesity of, for example headlights, or lagging engine RPMs, which are both undesirable vehicle characteristics.

DETAILED DESCRIPTION

Figure 1:
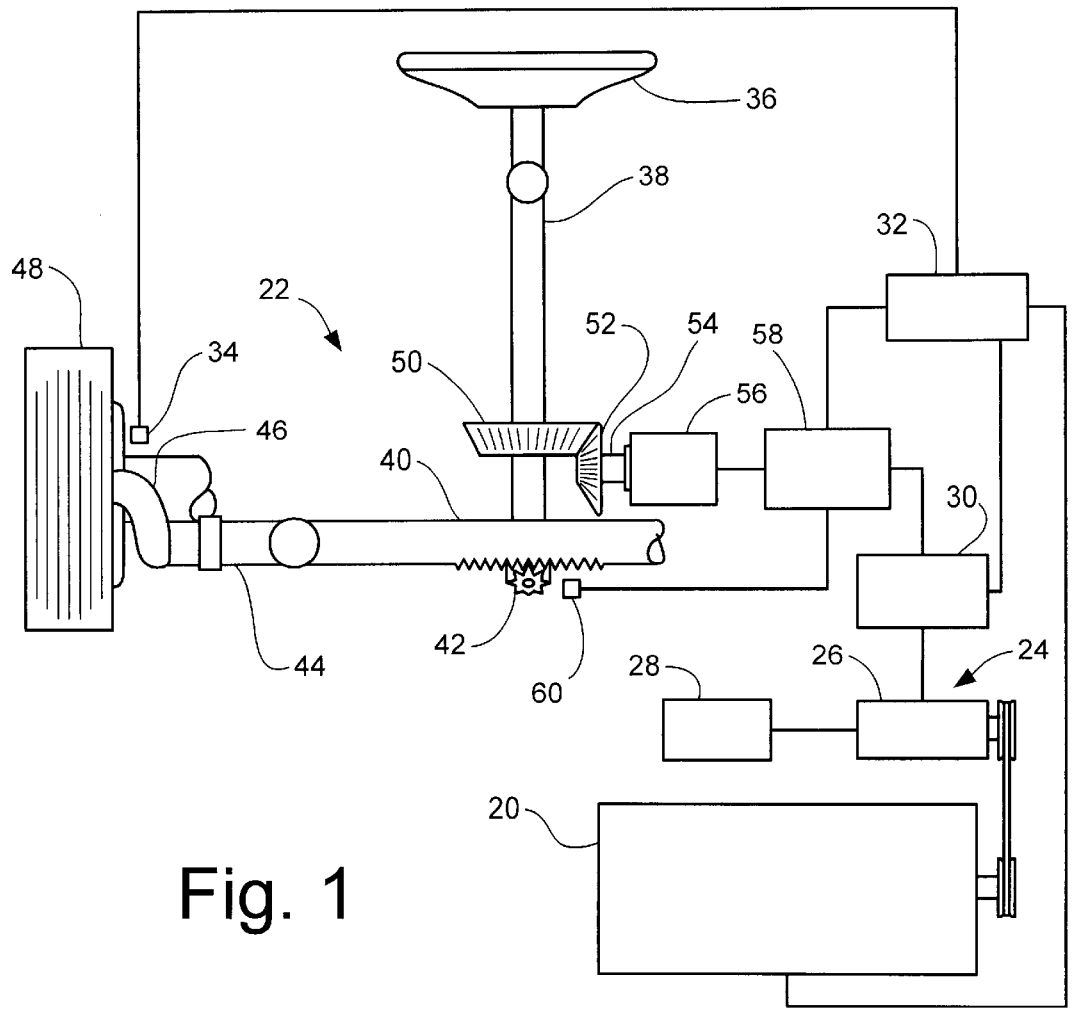
FIG. 1 is a schematic diagram of a portion of a steering assembly in accordance with the present invention.

FIG. 1 illustrates vehicle having an engine 20, a steering system 22 and a power generation and storage system 24. The power generation and storage system 24 includes an alternator 26, which is driven by the engine 20, and a battery 28, which is electrically connected to the alternator 26 in a conventional configuration. An alternator field current regulator 30 is electrically connected to the alternator 26 and to an engine controller 32, which in turn, is electrically connected to various sensors and subsystems on the engine 20. The engine controller 32 is also electrically connected to a vehicle speed sensor 34.

The steering system 22 includes a steering wheel 36 rotationally connected to a steering column 38, which is, in turn, connected to a rack 40 and pinion 42. The rack 40 connects to tie rods 44 (only one shown), which each, in turn, connect to a steering knuckle 46 (only one shown). The steering knuckles 46 each connect to a hub, wheel and tire assembly 48 (only one shown). The portion of the steering system 22 discussed so far is generally conventional, and other configurations of steering systems known to those skilled in the art may also be employed. The steering system 22 also includes a first bevel gear 50 mounted on the steering column 38 and a second bevel gear 52 meshed with the first gear 50. The second gear 52 connects to the output shaft 54 of an EPAS motor 56. The EPAS motor 56 is electrically connected to an EPAS motor drive and control unit 58, which, in turn, is electrically connected to the engine controller 32 and the alternator field current regulator 30. A steering rack sensor 60 is also electrically connected to the control unit 58.

Figure 3:
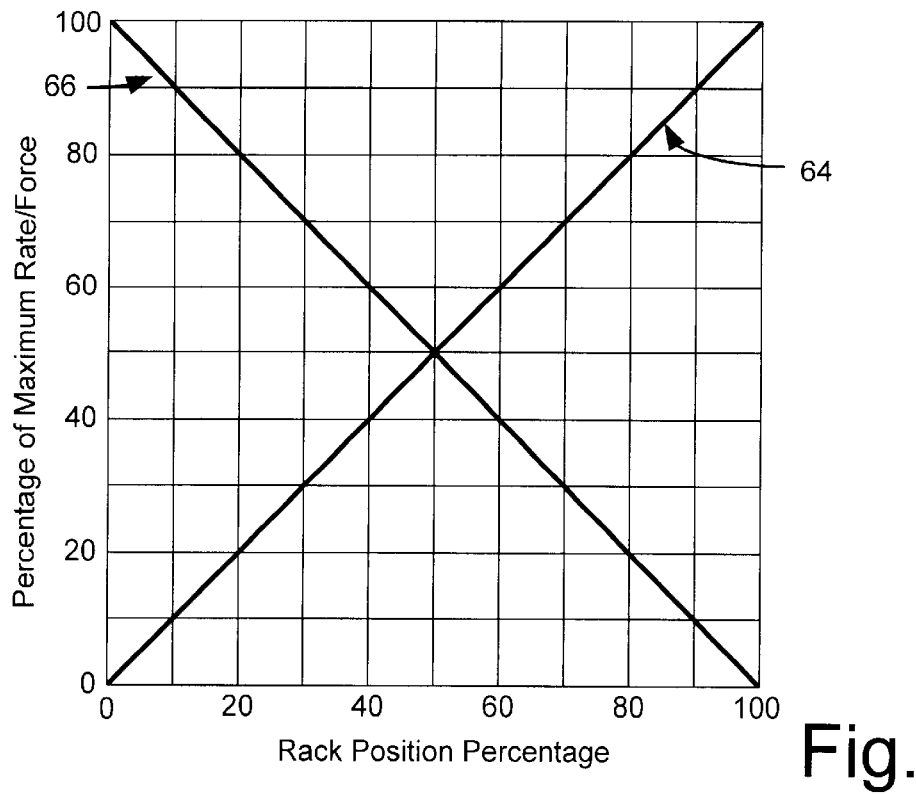
FIG. 3 is a graph illustrating a rack force and rack rate as a function of a steering rack position.
Figure 4:
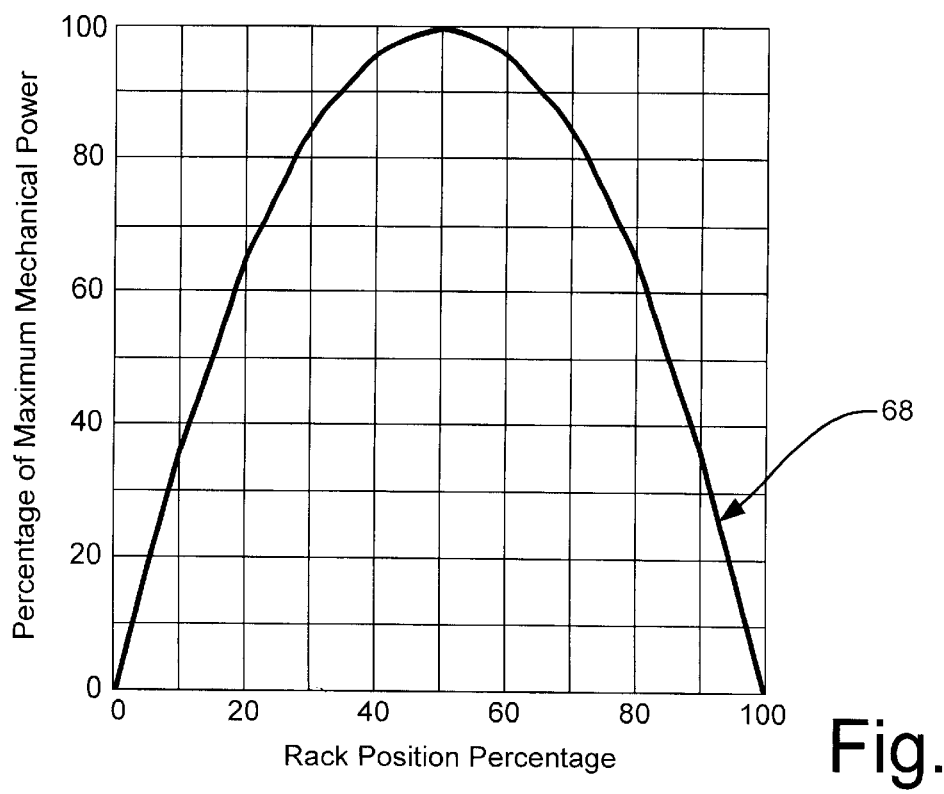
FIG. 4 is a graph illustrating the mechanical power required by EPAS as a function of steering rack position.
Figure 5:
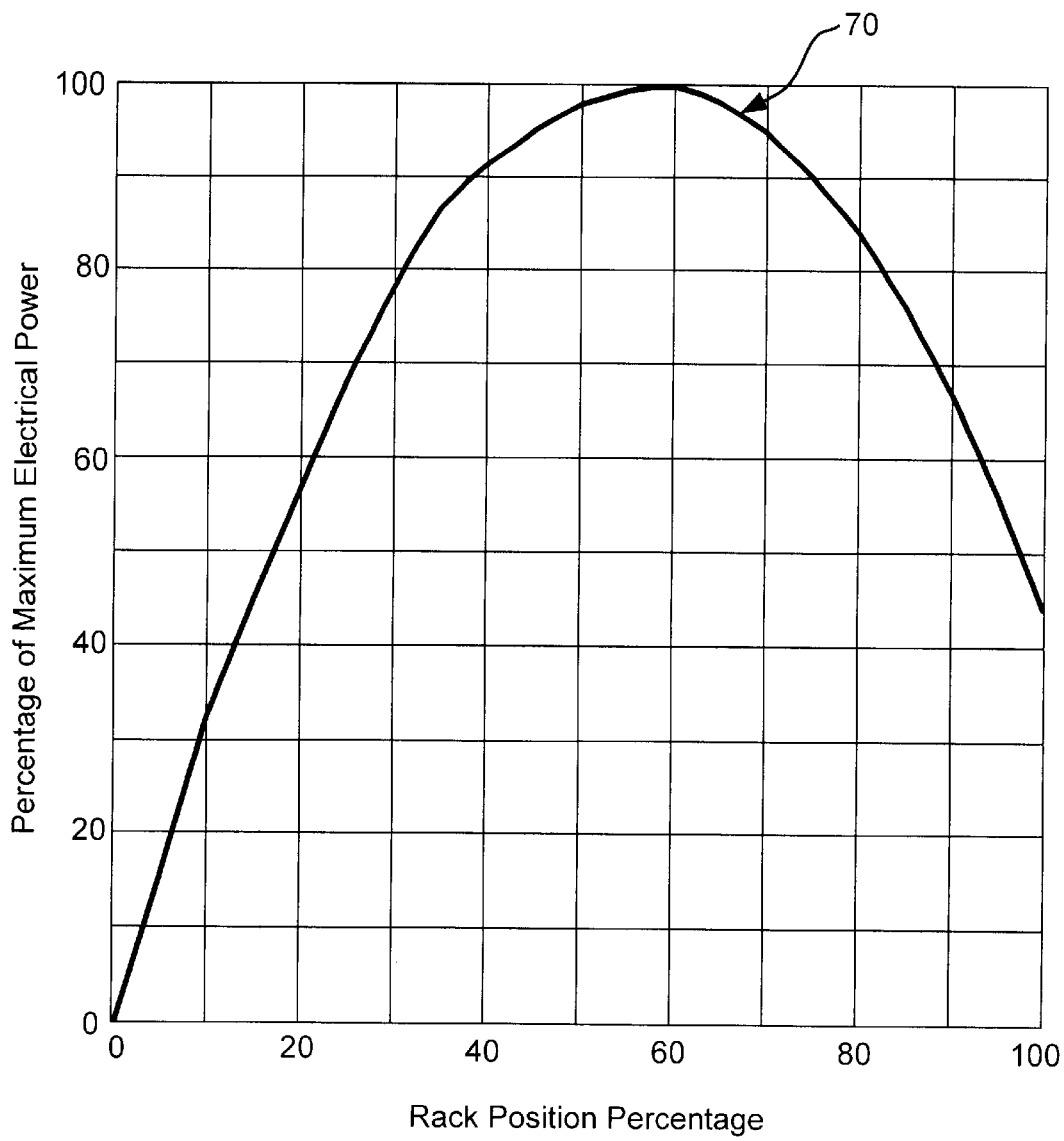
FIG. 5 is a graph illustrating the electrical power required by EPAS as a function of steering rack position.

FIGS. 3–5 illustrate some physical parameters for an EPAS system. FIG. 3 shows the percentage of the peak rack rate and rack force versus the rack position percentage. A zero rack position percentage is at the center of travel, while a one hundred percent rack position is at the end of travel (either fully to the left or fully to the right). Since the steering system requirements are symmetrical about the center of travel, only one direction of travel is shown in FIGS. 3–5.

One will note that the rack force 64 is lowest and the rack rate 66 is highest at the center of travel, while the rack force 64 is highest and the rack rate 66 is lowest at the end of travel. Since power is force multiplied by the rate, the mechanical power required by the steering system 68 (rack force times rack rate) will peak at the fifty percent rack position—as is illustrated in FIG. 4, which shows the percentage of maximum mechanical power required by the steering system versus the rack position percentage. FIG. 5 illustrates electrical power demand 70, which includes the mechanical power demand 68 of FIG. 4 with the addition of the losses of the EPAS motor and EPAS controller (power losses relating to the current squared multiplied by the resistance). It is important to assure that the vehicle systems account for this peak power demand of the EPAS system since it can be, for example, as high as 85–90 amperes, or more. Further, one will note that the current demand can rise very rapidly, with peak power demand rising to the maximum in time spans on the order of 500 milliseconds to several seconds.

Given the general physical parameters of FIGS. 3–5, then, one can employ information relating to the position of the steering rack, the speed of the steering rack, and the direction of its travel to predict whether the system is heading toward or away from a peak power demand—and, by also calculating the rack acceleration, the future electrical power demand and timing of this demand for the EPAS system may be determined.

Figure 2:
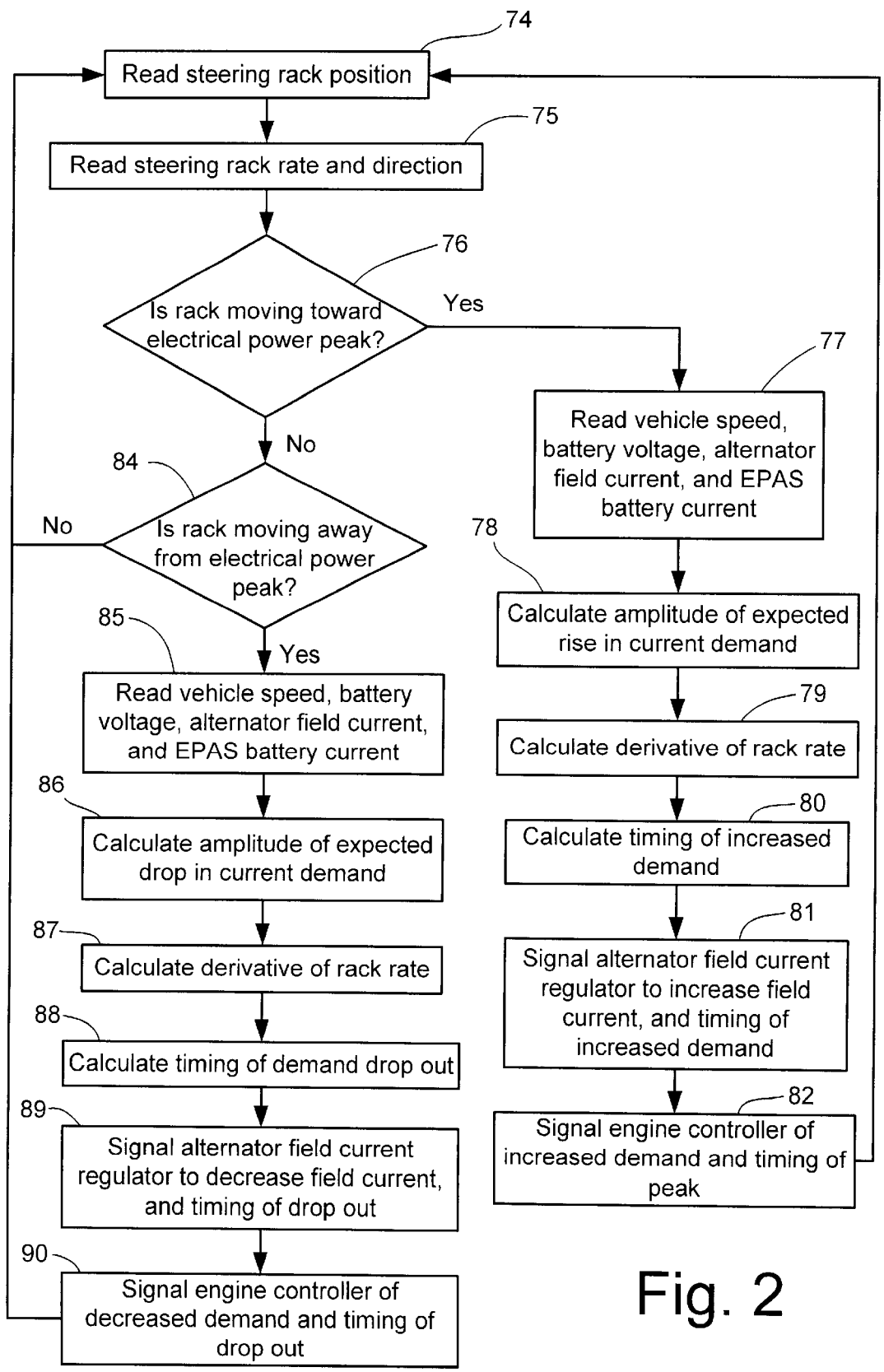
FIG. 2 is a flow chart illustrating a control process in accordance with the present invention.

FIG. 2 illustrates the process for predicting the future power demand, as well as the timing of the demand, which allows for adjustments to vehicle systems to account for increases and decreases in current demand from the EPAS system. A reading is taken of the steering rack position, block 74, and steering rack rate and direction, block 75. From this information, it can be determined if the steering rack is moving toward an electrical power peak, block 76. If it is moving toward an electrical power peak, readings are taken for the vehicle speed, battery voltage, alternator field current, and EPAS battery current, block 77. An amplitude of the expected rise in current demand is calculated, block 78. This value is the electrical current demand above the current EPAS battery electrical current, and is calculated by employing the steering rack position, the steering rack rate and the vehicle speed. The derivative of the rack rate is calculated, block 79, and the timing of the increased demand, block 80, is calculated. This value is calculated employing the steering rack rate and position, and the derivative of the rack rate. The expected current demand and the timing of the increased demand are preferably found in a look-up table calibrated for the particular vehicle and steering system, although other techniques for determining these values can also be employed. A signal is then sent to the alternator field current regulator to increase the alternator field current by the appropriate amount to meet the expected EPAS demand, as well as indicating the timing for the demand, block 81. Since the current battery voltage and the current alternator field current is known, the amount of increase can be easily calculated. Also, if the increase in alternator field current causes the overall electrical current demand on the alternator to exceed what will be produced by the alternator based upon the current engine speed, then a signal can be sent to the engine controller to increase the engine speed to meet the expected demand, block 82.

The signal indicating the expected future power demand will preferably lead the actual current EPAS power demand by the time constant of the alternator field winding and engine idle RPM controller. This will allow the current available for the EPAS system to match the demand at the time it is needed, rather than lagging behind the EPAS system. Thus, by analysis of immediately known data, a predictive signal with the timing and amount of future power demand can be determined and adjustments made to meet this demand.

To further refine the determination of the amount of increase in demand, there are additional inputs that may be employed. Such additional inputs may be, for example, engine temperature, outside air temperature, and battery/alternator current output.

The EPAS system can also account for significant dropout of electrical current demand. If, after reading the steering rack position, rate and direction, blocks 74, 75, it is determined that the steering rack is not moving toward an electrical peak, block 76, then it is determined if the steering rack is moving away from an electrical peak, block 84. If it is, then readings are taken for the vehicle speed, battery voltage, alternator field current, and EPAS battery current, block 85. An amplitude of the expected drop in current demand is calculated, block 86. The derivative of the rack rate is calculated, block 87, and the timing of the decreased demand, block 88, is calculated. A signal is then sent to the alternator field current regulator to decrease the alternator field current by the appropriate amount to avoid exceeding the expected EPAS demand, as well as indicating the timing for the demand, block 89. Also, if the engine speed had been increased to meet EPAS demand, and now the alternator field current will exceed demand based upon the current engine speed, then a signal can be sent to the engine controller to decrease the engine speed to account for the expected drop off in demand, block 90.

While certain embodiments of the present invention have been described in detail, those familiar with the art to which this invention relates will recognize various alternative designs and embodiments for practicing the invention as defined by the following claims.

What is claimed is:

1. A method for controlling a vehicle electric power supply that provides power to an electronic power assisted steering system, the method comprising the steps of:

determining a position of a steering member;

determining a rate of movement and a direction of movement for the steering member;

determining if the steering member is moving toward an electrical power peak;

determining the vehicle speed;

calculating the derivative of the rate of movement for the steering member;

calculating a first future point in time at which a particular electrical power increase is needed for the electronic power assisted steering system, if the steering member is moving toward the electrical power peak;

calculating the amplitude of the particular power increase at the first future point in time, if the steering member is moving toward the electrical power peak; and adjusting the electric power supply to produce a power output that includes the particular power increase, at the first future point in time, if the steering member is moving toward the electrical power peak.

2. The method of claim 1 further comprising the steps of:

determining if the steering member is moving away from the electrical power peak;

calculating a second future point in time at which a particular electrical power decrease is needed for the electronic power assisted steering system, if the steering member is moving away from the electrical power peak;

calculating the amplitude of the particular power decrease at the second future point in time, if the steering member is moving away from an electrical power peak; and adjusting the electrical power supply to produce a power output that includes the particular power decrease, at the second future point in time, if the steering member is moving away from the electrical power peak.

3. The method of claim 2 further including the steps of: controlling operation of a vehicle engine; and adjusting the engine to cause a decrease in the power output of the power supply, if the steering member is moving away from the electrical power peak.

4. The method of claim 2 wherein the step of calculating the amplitude of the particular power decrease at the second future point in time includes reading an alternator field current.

5. The method of claim 2 wherein the step of calculating the amplitude of the particular power decrease at the second future point in time includes reading a battery voltage.

6. The method of claim 2 wherein the step of calculating the amplitude of the particular power decrease at the second future point in time includes reading a battery current of the electronic power assisted steering system.

7. The method of claim 2 wherein the step of calculating the amplitude of the particular power decrease at the second future point in time includes the steps of: reading an alternator field current; reading a battery voltage; and reading a battery current of the electronic power assisted steering system.

8. The method of claim 1 further including the steps of: controlling the operation of a vehicle engine; and adjusting the engine to cause an increase in the power output of the power supply, if the steering member is moving toward the electrical power peak.

9. The method of claim 1 wherein the step of calculating the amplitude of the particular power increase at the first future point in time includes reading an alternator field current.

10. The method of claim 1 wherein the step of calculating the amplitude of the particular power increase at the first future point in time includes reading a battery voltage.

11. The method of claim 1 wherein the step of calculating the amplitude of the particular power increase at the first future point in time includes reading a battery current of the electronic power assisted steering system.

12. The method of claim 1 wherein the step of determining a position of a steering member includes determining the position of a steering rack; and wherein the step of determining a rate of movement and a direction of movement for the steering member includes determining the rate of movement and the direction of movement of the steering rack.

13. A method for controlling a vehicle electric power supply that provides power to an electronic power assisted steering system, the method comprising the steps of:

determining a position of a steering member;

determining a rate of movement and a direction of movement for the steering member;

determining if the steering member is moving toward an electrical power peak;

determining the vehicle speed;

calculating the derivative of the rate of movement for the steering member;

calculating a first future point in time at which a particular electrical power increase is needed for the electronic power assisted steering system, if the steering member is moving toward the electrical power peak;

calculating the amplitude of the particular power increase at the first future point in time, if the steering member is moving toward the electrical power peak;

adjusting the electric power supply to produce a power output that includes the particular power increase, at the first future point in time, if the steering member is moving toward the electrical power peak;

determining if the steering member is moving away from the electrical power peak;

calculating a second future point in time at which a particular electrical power decrease is needed for the electronic power assisted steering system, if the steering member is moving away from the electrical power peak;

calculating the amplitude of the particular power decrease at the second future point in time, if the steering member is moving away from an electrical power peak; and adjusting the electrical power supply to produce a power output that includes the particular power decrease, at the second future point in time, if the steering member is moving away from the electrical power peak.

14. The method of claim 13 wherein the step of calculating the amplitude of the particular power increase at the first future point in time includes the steps of: reading an alternator field current; reading a battery voltage; and reading a battery current of the electronic power assisted steering system.

15. The method of claim 13 wherein the step of calculating the amplitude of the particular power decrease at the second future point in time includes the steps of: reading an alternator field current; reading a battery voltage; and reading a battery current of the electronic power assisted steering system.

16. The method of claim 13 further including the steps of: controlling the operation of a vehicle engine; and adjusting the engine to cause an increase in the power output of the power supply, if the steering member is moving toward the electrical power peak.

17. An apparatus for a vehicle having an engine and an alternator, the apparatus comprising:

a steering system including a steering wheel, a steering assembly operatively engaging the steering wheel and adapted to engage a vehicle wheel assembly, an electric motor operatively engaging the steering assembly, and a steering motor controller operatively engaging the electric motor;

a steering sensor capable of determining at least one of a position of the steering assembly and a rate of movement of the steering assembly;

a first determinor for determining if the steering assembly is moving toward an increase in a power requirement;

a second determinor for determining an amplitude of the increase in the power requirement;

a third determiner for determining a timing of the increase; and a current regulator adapted for adjusting the power output of the alternator in response to the amplitude and timing of the increase.

18. The apparatus of claim 17 wherein the steering assembly includes a rack and a pinion, and wherein the steering sensor operatively engages the rack.

19. The apparatus of claim 17 further including an engine controller operatively engaging the steering motor controller, and a vehicle speed sensor operatively engaging the engine controller.

20. The apparatus of claim 17 wherein the third determiner includes a calculator adapted for calculating a derivative of the rate of movement of the steering assembly.

* * * * *